(12) United States Patent
Murata et al.

(10) Patent No.: US 8,515,631 B2
(45) Date of Patent: Aug. 20, 2013

(54) CONTROL DEVICE FOR AUTOMATIC TRANSMISSION OF VEHICLE

(75) Inventors: Ryuji Murata, Wako (JP); Hiroyuki Takeo, Wako (JP); Kazuma Sasahara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 12/797,390

(22) Filed: Jun. 9, 2010

(65) Prior Publication Data

US 2010/0318267 A1 Dec. 16, 2010

(30) Foreign Application Priority Data

Jun. 11, 2009 (JP) ................................. 2009-140174

(51) Int. Cl.
*F16H 61/02* (2006.01)

(52) U.S. Cl.
USPC .......................................................... 701/52

(58) Field of Classification Search
USPC .......................................................... 701/52
See application file for complete search history.

(56) References Cited

U.S. PATENT DOCUMENTS

| | | | | |
|---|---|---|---|---|
| 4,733,581 A | * | 3/1988 | Hasegawa et al. | 477/98 |
| 4,937,749 A | * | 6/1990 | Dunkley et al. | 701/52 |
| 4,977,797 A | * | 12/1990 | Aoki et al. | 477/129 |
| 5,337,630 A | * | 8/1994 | Sakai et al. | 701/57 |
| 5,966,934 A | * | 10/1999 | Kosuge | 60/362 |
| 6,085,139 A | | 7/2000 | Nakauchi et al. | |
| 6,402,661 B2 | * | 6/2002 | Morita et al. | 477/108 |
| 2009/0062067 A1 | * | 3/2009 | Iwase et al. | 477/52 |

FOREIGN PATENT DOCUMENTS

| | | | |
|---|---|---|---|
| JP | 4-145257 A | | 5/1992 |
| JP | 08193655 A | * | 7/1996 |
| JP | 09257126 A | * | 9/1997 |
| JP | 10078123 A | * | 3/1998 |
| JP | 10-141485 A | | 5/1998 |
| JP | 11078617 A | * | 3/1999 |
| JP | 2000-104823 A | | 4/2000 |
| JP | 2003-130196 A | | 5/2003 |
| JP | 2004060734 A | * | 2/2004 |
| JP | 2004270833 A | * | 9/2004 |
| JP | 3638389 B2 | | 4/2005 |
| JP | 2007155025 A | * | 6/2007 |
| JP | 2009085367 A | * | 4/2009 |
| JP | 2004-270833 A | | 9/2009 |

OTHER PUBLICATIONS

JPO machine translation of JP 2004-270833.*
JPO machine translation of JP 08-193655 (JP document published Jul. 30, 1996).*
Wong, J.Y. et al., "Theory of Ground Vehicles", John Wiley & Sons, New York, 2001, pp. 240-246 (automatic transmissions).*
JPO machine translation of JP 2004-270833 (original JP document published Sep. 30, 2004).*
Notice of Reasons for Rejection dated Sep. 28, 2012, (SIPO).

* cited by examiner

*Primary Examiner* — James Trammell
*Assistant Examiner* — David Testardi
(74) *Attorney, Agent, or Firm* — Arent Fox LLP

(57) ABSTRACT

A driving force margin of a vehicle is calculated on the basis of an engine load, vehicle speed, travel resistance and estimated uphill gradient. A gear is determined on the basis of predetermined gear shifting characteristics at least from the vehicle speed and the engine load in an automatic shift mode. Automatic down shift is generated in the case where the vehicle speed becomes lower than vehicle speed on an automatic down shift vehicle speed table set up in accordance with the gear when the operation is switched from the automatic shift mode to a manual shift mode. The automatic down shift vehicle speed table is corrected so as to shift an automatic down shift line to a high vehicle speed side or low vehicle speed side in accordance with the magnitude of the calculated driving force margin of the vehicle.

3 Claims, 5 Drawing Sheets

<SMALL DRIVING FORCE MARGIN>

<LARGE DRIVING FORCE MARGIN>

<MEDIUM DRIVING FORCE MARGIN>

<SMALL DRIVING FORCE MARGIN>

CONTROL DEVICE FOR AUTOMATIC TRANSMISSION OF VEHICLE

CROSS-REFERENCE TO RELATED APPLICATION

The present disclosure relates to subject matter contained in Japanese Patent Application No. 2009-140174, filed on Jun. 11, 2009, the disclosure of which is expressly incorporated herein by reference in its entirety.

BACKGROUND OF THE INVENTION

1. Field of the Invention

The present invention relates to a control device for an automatic transmission of a vehicle, and particularly, the present invention relates to a control device for an automatic transmission of a vehicle capable of generating automatic down shift in a manual shift mode at appropriate timing.

2. Description of the Related Art

An automatic transmission for a vehicle is provided with a plurality of ranges (shift positions such as Parking (P), Reverse (R), Neutral (N), Drive (D), Second (2) and Low (1)). The Drive range that is an automatic gear shifting range functions as an automatic shift mode in which automatic gear shifting is carried out on the basis of vehicle speed indicating a driving state and a throttle valve opening degree indicating an engine load in accordance with a gear shifting characteristic (shift map) stored in advance. Further, there is an automatic transmission configured so as to function as a manual shift mode (driver instruction mode) in which switching of an operation mode from the automatic shift mode allows a driver (or operator) to instruct shift up or shift down manually via a shift lever or a switch provided on a steering.

In the manual shift mode, driveability may be lowered because of reasons as follows. Namely, in setting of a gear (gear ratio) required by a driver, acceleration feel is lacking due to lowering of the number of revolutions of an engine, or engine braking hardly works by selecting a high gear ratio at low vehicle speed. In order to solve these problems, an automatic down shifting function is provided in the manual shift mode. The automatic down shifting function carries out down shift independently of a manual operation of a driver if needed. In the automatic down shifting function of the manual shift mode, distribution of vehicle speed for carrying out automatic down shift in each gear (that is, a shift map) is set up in advance. A conventional control device of an automatic transmission shown in Japanese Patent No. 3638389 is adapted to carry out control to switch vehicle speed distribution for automatic down shift between a flat road side and an uphill road side on the basis of estimated uphill gradient of the vehicle.

On the other hand, a torque converter is mounted on the automatic transmission. A lock-up clutch is provided in most of the torque converters. Engagement of the lock-up clutch causes a power transmission efficiency to be heightened, whereby fuel economy of the vehicle is improved. However, in order to further improve fuel economy, it is desired to broaden an engagement region of the lock-up clutch. However, since variation in engine torque is directly transmitted to a drive system in the engagement region of the lock-up clutch, broadening of the engagement region causes increase in noise or vibration.

Thus, technique to suppress transmission of the variation in engine torque to the drive system by carrying out slip control to cause the lock-up clutch to slip slightly is used. However, when the lock-up clutch is caused to continuously slip, a calorific value of a friction member (facing member) with which the lock-up clutch is provided increases to become high temperature. In the case where such a state of high temperature continues for a long time, a mirrored process, abrasion, carbonization or the like of a surface of the friction member occurs, there is a fear that a decrease of frictional force occurs. Further, when the friction member becomes high temperature, an increase in a slippage amount of the torque converter causes heat generation by a work loss to increase in addition to heat generation of the friction member.

In the automatic down shifting control of the conventional manual shift mode, switching of vehicle speed tables (vehicle speed distribution) for the automatic down shift is carried out on the basis of driving gradient of the vehicle. In addition, two kinds of vehicle speed tables for a flat road and an uphill road are merely switched. However, a driving force margin affecting a traveling performance of the vehicle is determined depending upon many factors in addition to the driving gradient. Thus, there has been a problem that automatic down shift is not always generated at appropriate timing in the case where switching of vehicle speed tables is carried out on the basis of only the driving gradient. For example, in the case of a cruise driving state on an uphill road (traction state on the uphill road and the like), the driving force margin of the vehicle becomes smaller, vehicle speed does not increase smoothly and tends to stagnate. However, automatic down shift may not be generated even in such a situation.

In this way, there has been a fear that vehicle speed stagnates in a region in which a slip ratio of the lock-up clutch is large (loose region) for a long time if a state in which the driving force margin is small continues and the vehicle speed does not increase smoothly. There has been a problem that this causes a facing calorific value of the lock-up clutch to increase and temperature of hydraulic oil (ATF) in the torque converter is thereby raised.

Further, there has been a problem that automatic down shift is generated even in a situation that down shift is not required essentially, for example, the case where the driving force margin is a medium degree or more and the vehicle speed increases smoothly when a vehicle speed table for an uphill road is selected in automatic down shift control. In this regard, since a wide variety of shift maps are prepared in accordance with estimated uphill gradient in the automatic shift mode (D range), a region in which the driving force margin is large is appropriately selected in accordance with a driving state of the vehicle. Therefore, a problem that the slip ratio of the lock-up clutch stagnates in the loose region for a long time hardly occurs.

Moreover, in the automatic down shifting control of the conventional manual shift mode, vehicle speed at which automatic down shift is generated has given distribution with respect to throttle valve opening degrees indicating an engine load. For that reason, in the case where the vehicle drives on a light uphill road or a flat road at the same vehicle speed when automatic down shift vehicle speed suitable for a cruise driving state on an uphill road (state in which the throttle valve opening degree is high) is set up, automatic down shift is generated in a state in which the throttle valve opening degree is very low or zero. There has been a problem that this causes driving force during deceleration (engine brake) of the vehicle to overwork to deteriorate driveability of the vehicle.

SUMMARY OF THE INVENTION

The present invention is made in view of the above points, and it is an object of the present invention to provide a control device of an automatic transmission for a vehicle capable of suppressing rise in temperature of a torque converter and of ensuring good driveability by generating automatic down shift in a manual shift mode at appropriate timing.

In order to solve the problem described above, the present invention is directed to a control device of an automatic transmission for a vehicle. The control device (1) according to the present invention includes a vehicle speed detecting section (35) for detecting vehicle speed and an engine load detecting section (36) for detecting an engine load.

The control device (1) also includes: a travel resistance calculating section (30) for calculating travel resistance of the vehicle; an uphill gradient calculating section (30) for calculating estimated uphill gradient of the vehicle; and a driving force margin calculating section (30) for calculating a driving force margin of the vehicle on the basis of the engine load, the vehicle speed, the travel resistance and the estimated uphill gradient.

The control device (1) also includes: an automatic gear shifting section (30) that determines a gear on the basis of predetermined gear shifting characteristics at least from the detected vehicle speed and the engine load to carry out automatic gear shifting; a manual gear shifting signal outputting section (SW3, SW4) for outputting a manual gear shifting signal indicating a shift up instruction or shift down instruction by a driver of the vehicle; and a manual gear shifting section (30) for carrying out, in response to the manual gear shifting signal outputted from the manual gear shifting signal outputting section (SW3, SW4), gear shifting from the gear determined on the basis of the predetermined gear shifting characteristics in accordance with the shift up instruction or shift down instruction.

The control device (1) also includes: a shift mode switching section (50) for switching an operation between a shift mode by the automatic gear shifting section (30) and a shift mode by the manual gear shifting section (30); and an automatic down shifting section (30) that generates automatic down shift in the case where the vehicle speed detected by the vehicle speed detecting section (35) becomes lower than vehicle speed on an automatic down shift vehicle speed table set up in accordance with the gear when the shift mode switching section (50) switches the operation to the shift mode by the manual gear shifting section (30).

In this case, the automatic down shifting section (30) corrects the automatic down shift vehicle speed table so as to shift to a high vehicle speed side or low vehicle speed side in accordance with the magnitude of the driving force margin of the vehicle calculated by the driving force margin calculating section (30).

In this regard, as a concrete example of switching of the automatic down shift vehicle speed table herein, the automatic down shift vehicle speed table may be switched so that the smaller the driving force margin of the vehicle calculated by the driving force margin calculating section is, the more the vehicle speed generated by the automatic down shift becomes to the high vehicle speed side.

According to the control device of the automatic transmission for the vehicle of the present invention, by switching the automatic down shift vehicle speed tables in the manual shift mode in accordance with the driving force margin of the vehicle, it is possible to generate the automatic down shift at appropriate timing in response to lowering of the driving force margin of the vehicle even in a situation in which the driving force margin of the vehicle is determined by means of influence on other factors in addition to the estimated uphill gradient. Therefore, it is possible to effectively prevent the vehicle speed from stagnating. This makes it possible to prevent the slip ratio of the lock-up clutch from stagnating in the loose region for a long time. Therefore, it is possible to effectively suppress rise in temperature of the hydraulic oil due to heat generation of the torque converter.

Further, since the automatic down shift vehicle speed tables are switched in accordance with the driving force margin of the vehicle, it becomes possible to suppress generation of unnecessary automatic down shift when the driving force margin of the vehicle is sufficient.

Further, in the control device (1) of the automatic transmission for the vehicle as described above, it is preferable that the automatic down shifting section (30) further corrects the automatic down shift vehicle speed table so as to respectively shift the high vehicle speed side or low vehicle speed side in the case where the engine load detected by the engine load detecting section (36) is higher or lower than a predetermined threshold value. According to this configuration, both effective suppression of rise in temperature of the torque converter in a situation in which the driving force margin of the vehicle is determined by means of influence on other factors in addition to the estimated uphill gradient and securement of good driveability by means of suppression of excess engine braking during deceleration of the vehicle become possible. In this regard, as a concrete example of switching of the automatic down shift vehicle speed table herein, the automatic down shift vehicle speed table may be switched so that vehicle speed generated by the automatic down shift is shifted to higher vehicle speed side when the engine load is higher than the threshold value than that when the engine load is lower than the threshold value.

In this regard, reference numerals in parenthesis here are shown as one example of the present invention to indicate reference numerals of corresponding components of an embodiment (will be described later).

According to the control device of the automatic transmission for the vehicle of the present invention, it is possible to suppress rise in temperature of a torque converter and secure driveability by generating automatic down shift in a manual shift mode at appropriate time in accordance with a driving force margin of a vehicle.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIGS. 3A, 3B and 3C are respectively graphs showing the automatic down shift lines at which driving force margins are "Large", "Medium" and "Small";

DETAILED DESCRIPTION OF THE INVENTION

Figure 1:
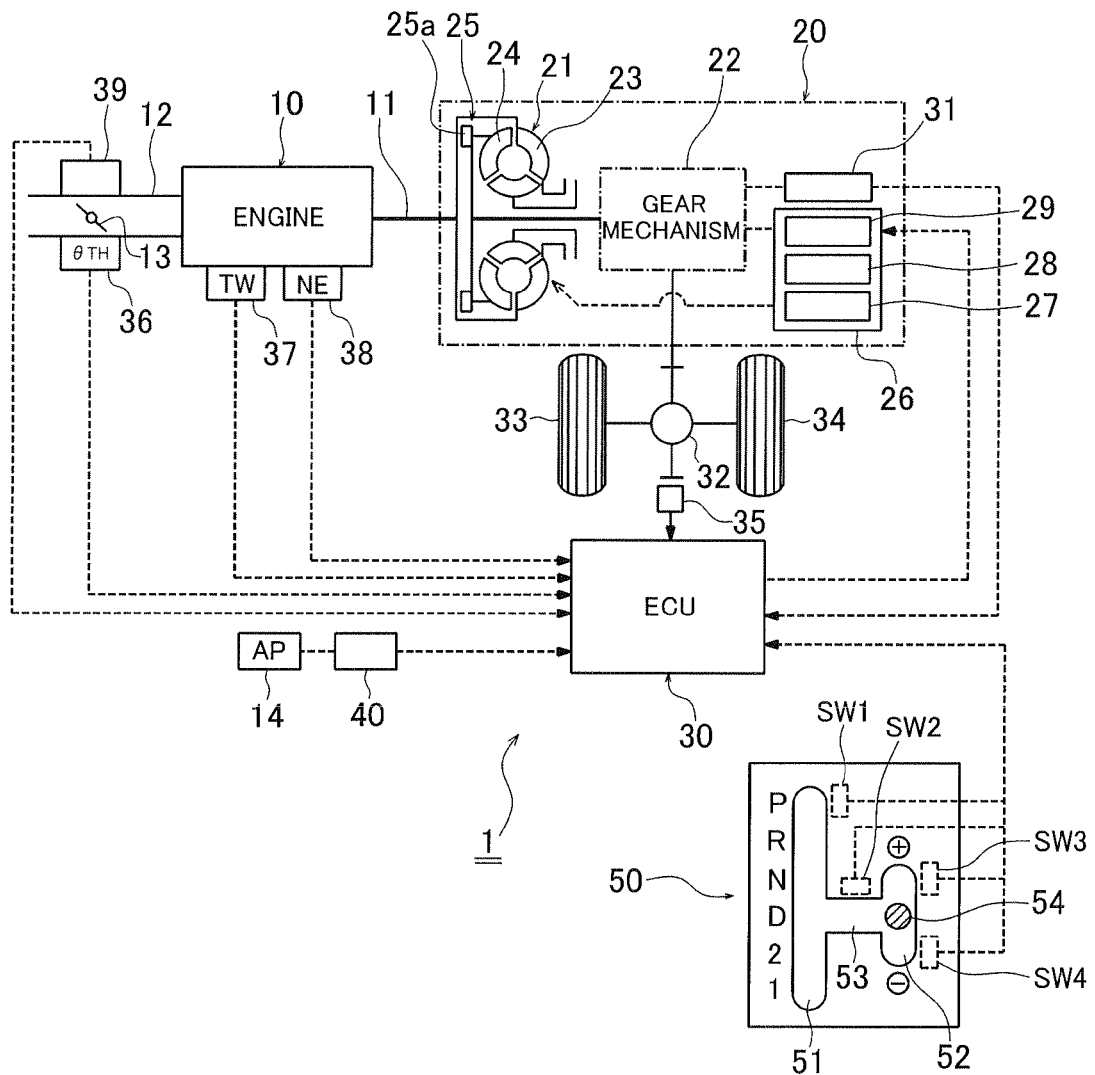
FIG. 1 is a view showing a drive system mounted on a vehicle and a schematic configuration of a control device thereof.

Hereinafter, an embodiment of the present invention will be described in detail with reference to the appending drawings. FIG. 1 is a schematic view showing a drive system mounted on a vehicle and a configuration of a control device thereof. The drive system shown in FIG. 1 includes an automatic transmission 20 connected to a crank shaft 11 of an engine 10. The automatic transmission 20 includes a torque converter 21 connected to the crank shaft 11 and a multi-stage shift gear mechanism 22 connected to an output side of the torque converter 21. The torque converter 21 has a pump impeller 23 and a turbine runner 24. The torque converter 21 is also provided with a lock-up clutch 25 for connecting the pump impeller 23 to the turbine runner 24. The torque converter 21 and the multi-stage shift gear mechanism 22 are controlled by a hydraulic control mechanism 26.

The hydraulic control mechanism 26 includes an on/off type solenoid valve (hereinafter, referred to as "first solenoid valve") 27, a duty control type solenoid valve (hereinafter, referred to as "second solenoid valve") 28 and a gear shift actuator 29. The first solenoid valve 27 switches engagement and disengagement of the lock-up clutch 25. The duty control type solenoid valve 28 controls engagement pressure when the first solenoid valve 27 is turned on and the lock-up clutch 25 is thereby in an engagement state. The gear shift actuator 29 controls a shift position (gear ratio) of the multi-stage shift gear mechanism 22.

In the control device 1 of the present embodiment, the first solenoid valve 27, the second solenoid valve 28 and the gear shift actuator 29 are connected to an electronic control unit (hereinafter, referred to as "ECU") 30 for controlling the automatic transmission 20. The ECU 30 is adapted to control an engagement state of the lock-up clutch 25 via the first solenoid valve 27 and the second solenoid valve 28, and to control a shift position of the multi-stage shift gear mechanism 22 via the gear shift actuator 29.

Further, a shift position sensor 31 for detecting a shift position of the multi-stage shift gear mechanism 22 is provided in the control device 1. A detected signal of the shift position sensor 31 is supplied to the ECU 30. An output of the engine 10 is transmitted to right and left drive wheels 34, 33 from the crank shaft 11 through the torque converter 21, the multi-stage shift gear mechanism 22 and a differential 32 in turn. Further, a vehicle speed sensor (vehicle speed detecting section) 35 for detecting vehicle speed is provided at an output side of the automatic transmission 20. A detected signal of the vehicle speed sensor 35 is supplied to the ECU 30.

Further, in the vicinity of the engine 10, a throttle valve opening degree sensor (engine load detecting section) 36 for detecting an opening degree of a throttle valve 13 (hereinafter, referred to as a "throttle valve opening degree"), an engine water temperature sensor 37 for detecting temperature of cooling water for the engine 10 and an engine revolution sensor 38 for detecting the number of revolutions of the engine 10 are provided. The throttle valve opening degree sensor 36 is installed in the middle of an air inlet pipe 12. Detected signals of these sensors are supplied to the ECU 30.

Further, a throttle actuator 39 composed of an electric motor, for example, is connected to the throttle valve 13. This throttle actuator 39 is connected to the ECU 30. An accelerator pedal opening degree sensor 40 for detecting a pressing amount (hereinafter, "accelerator pedal opening degree") of an accelerator pedal 14 of the vehicle is connected to the ECU 30. A detected signal of the accelerator pedal opening degree sensor 40 is supplied to the ECU 30. Namely, in the present embodiment, the accelerator pedal 14 is not mechanically connected to the throttle valve 13, and the throttle valve opening degree is controlled in accordance with the accelerator pedal opening degree and other driving state.

The control device 1 of the present embodiment receives an instruction based on an operation of a shift lever mechanism 50 provided in the vicinity of a driver's seat of the vehicle, and carries out gear shifting control for the automatic transmission 20. The shift lever mechanism 50 is provided with a shift lever 54. The shift lever 54 is movably installed along a rough H-shaped groove having a main gate 51, a sub gate 52 and a communicating line 53 for communicating them with each other. Further, in the shift lever mechanism 50, a position switch SW1, a selection mode detecting switch SW2, an up shift switch SW3 and a down shift switch SW4 are provided. The position switch SW1 detects a shift position of the main gate 51. The selection mode detecting switch SW2 detects whether an automatic shift mode or a manual shift mode is selected on the basis of whether the shift lever 54 is positioned in the main gate 51 or the sub gate 52. The up shift switch SW3 detects that the shift lever 54 is operated to an up shift direction (+ (plus) direction) in the sub gate 52. The down shift switch SW4 detects that the shift lever 54 is operated to a down shift direction (− (minus) direction) in the sub gate 52. Detected signals of the position switch SW1, the selection mode detecting switch SW2, the up shift switch SW3 and the down shift switch SW4 are outputted to the ECU 30.

The main gate 51 is used for an automatic gear shifting mode (automatic shift mode). Any one of ranges (positions) including P, R, N, D, 2 and 1 is selected in the main gate 51 in response to an operation of the shift lever 54. Further, the sub gate 52 is used for a manual shift mode in which the driver may carry out shift up and shift down operations in forward gears manually. More specifically, when the driver moves the shift lever 54 to the plus direction after moving the shift lever 54 from the main gate 51 to the sub gate 52, the up shift switch SW3 outputs a shift up instruction to the ECU 30. On the other hand, when the driver moves the shift lever 54 to the minus direction, the down shift switch SW4 outputs a shift down instruction to the ECU 30. In this regard, the shift lever 54 existing in the sub gate 52 has been explained as an example of an operator for the manual shift mode herein. In addition to this example, the control device 1 may be configured so that a shift operation of the manual shift mode is carried out by means of a paddle switch provided on a steering or the like (illustration thereof is omitted).

In the control device 1 according to the present embodiment, when the automatic shift mode (automatic gear shifting range) is selected in the shift lever mechanism 50, in response to the selected shift position, gear shifting is automatically carried out in accordance with a shift map stored in advance. Since this gear shifting control by the automatic shift mode is similar to gear shifting control by a conventional automatic transmission, its detailed explanation is omitted here.

On the other hand, when the manual shift mode is selected in the shift lever mechanism 50, the driver is allowed to carry out shift up or shift down by manual. In this manual shift mode, in order to avoid disadvantage such as lowering of driveability when a gear required by the driver does not meet a driving state of the vehicle, an automatic down shifting function is provided for generating down shift in spite of the shift position selected by the driver. In this automatic down shifting function, vehicle speed, at which it is determined that there is no problem such as driveability for every gear, is determined, and automatic down shift is generated when current vehicle speed falls below the determined vehicle speed. Hereinafter, the case where automatic down shift control in this manual shift mode is carried out will be described.

Figure 2A:
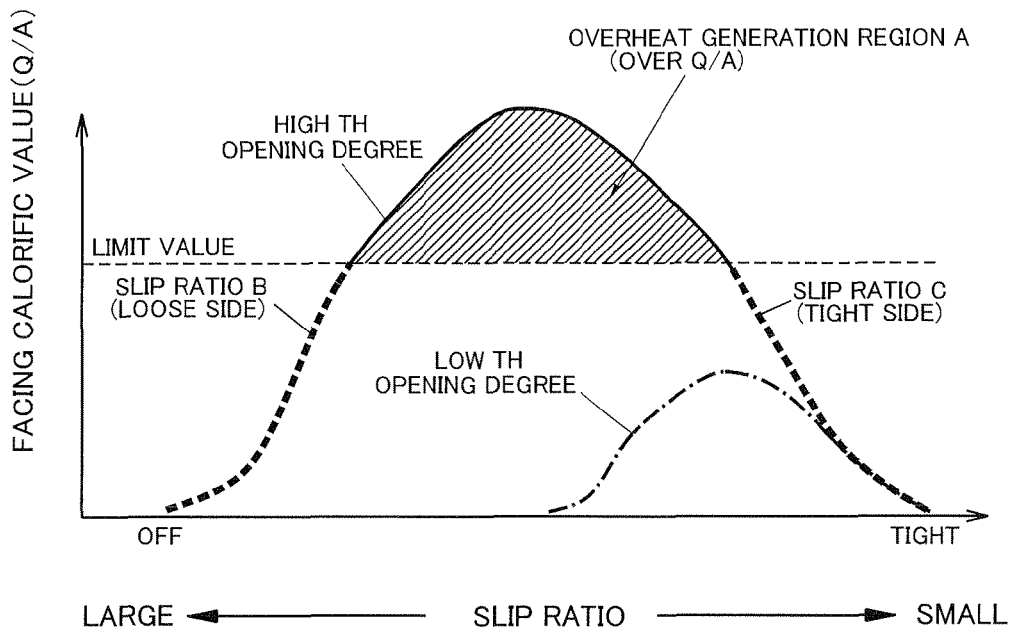
FIG. 2A is a graph showing distribution of estimate values (calculated values) of a facing calorific value with respect to a slip ratio of a lock-up clutch.

In order to explain the automatic down shift control, slip control for the lock-up clutch 25 carried out by the control device 1 according to the present embodiment will first be described. FIG. 2A is a graph showing distribution of calculated values (estimate values) of a calorific value (facing calorific value) Q/A with respect to the slip ratio of the lock-up clutch 25. The facing calorific value Q/A is a calorific value (cal/cm$^2$/sec) per unit surface area and unit time of a friction member 25a with which the lock-up clutch 25 is provided. The facing calorific value Q/A is distribution having a boundary point (inflection point) at which the facing calorific value is switched from an increase to a decrease with respect to a change in the slip ratio. In the state of the high throttle valve opening degree, an overheat generation region (hatching region of FIG. 2A) A exists in a stationary usage region of the lock-up clutch 25. In the overheat generation region A, the facing calorific value Q/A exceeds an acceptable range (limit value) of the slip ratio between a loose side and a tight side. For that reason, a target slip ratio of the lock-up clutch 25 requires any one target setting of a loose side slip ratio B and a tight side slip ratio C. The loose side slip ratio B exists at a loose side from the overheat generation region A in which the facing calorific value Q/A becomes the acceptable range. The tight side slip ratio C exists at a tight side from the overheat generation region A.

Figure 2B:
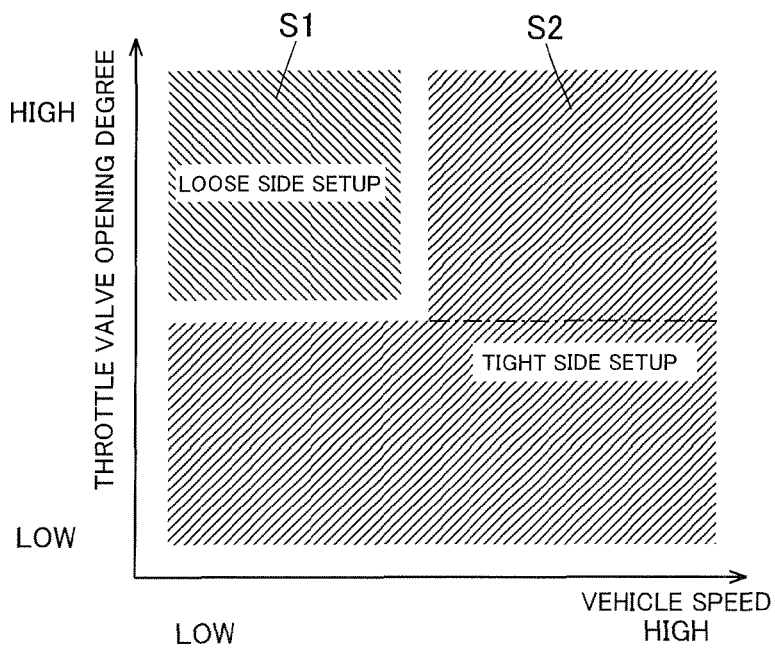
FIG. 2B is a view showing a configuration example of the slip ratio of the lock-up clutch with respect to vehicle speed and a throttle valve opening degree.

FIG. 2B is a view showing a configuration example of the slip ratio of the lock-up clutch 25 with respect to the vehicle speed and the throttle valve opening degree. Since large driving force is required in a region S1 shown in FIG. 2B at which vehicle speed is low and a throttle valve opening degree is high, setting for the loose side slip ratio B shown in FIG. 2A is required. On the other hand, in a region S2 other than the region S1 (that is, a region at which a throttle valve opening degree is low, and a region at which vehicle speed is high and a throttle valve opening degree is high), it is possible to use the tight side slip ratio C shown in FIG. 2A.

However, in the case where the lock-up clutch 25 is caused to continuously slip at the setting of the loose side slip ratio B, the calorific value of the lock-up clutch 25 increases to become high temperature. In the case where such a state of high temperature continues for a long time, a mirrored process or the like of a surface of the friction member (facing member) 25a occurs, and thus, there is a fear that a decrease of the frictional force occurs. Further, when the friction member 25a becomes high temperature, an increase of the slippage amount of the torque converter 21 causes heat generation due to a work loss to increase in addition to heat generation of the friction member 25a. Therefore, there is necessary that a relationship between the vehicle speed and the throttle valve opening degree is prevented from stagnating in the region 51 shown in FIG. 2B during driving of the vehicle for a long time.

Figure 3A:
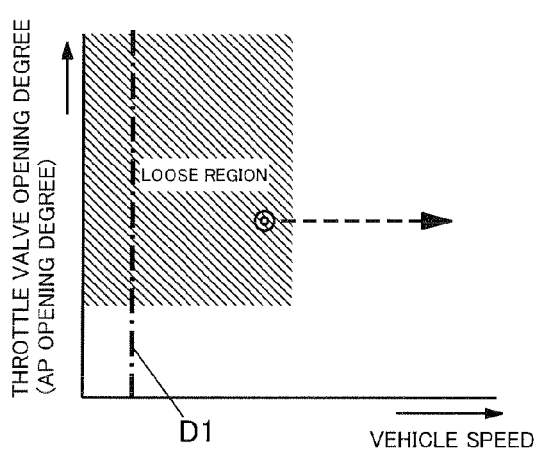
FIGS. 3A-3C are graphs each showing an automatic down shift line (down shift vehicle speed table) in a manual shift mode.
Figure 3B:
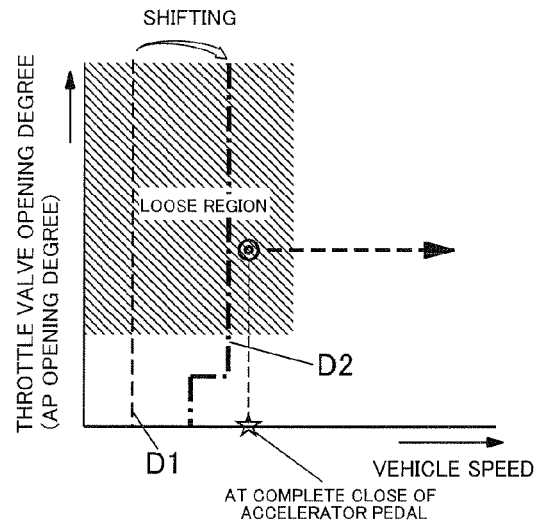
Figure 3C:
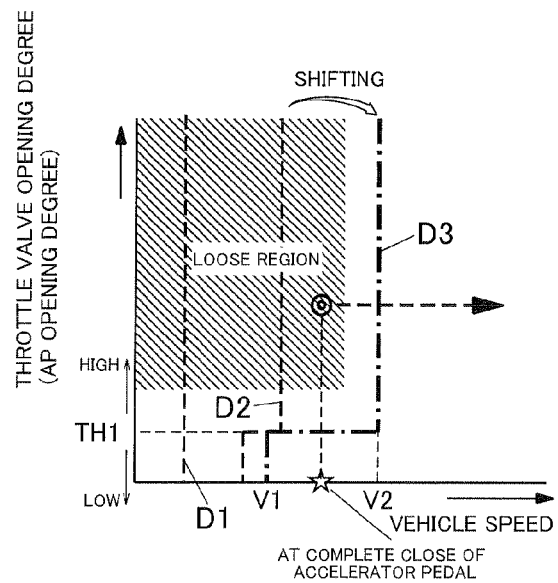

FIGS. 3A to 3C are views each showing a view showing a vehicle speed table for the automatic down shift in the manual shift mode, and is a graph showing a relationship between vehicle speed and a throttle valve opening degree (or an accelerator pedal opening degree). In the automatic down shift control, automatic down shift is generated in the case where vehicle speed indicating a driving state and a throttle valve opening degree (or accelerator pedal opening degree) indicating an engine load change over a predetermined threshold value in accordance with the gear shifting characteristics stored in advance. In the control device 1 according to the present embodiment, as will be described later, a plurality of vehicle speed tables, any one of which is selected in accordance with a driving force margin of the vehicle, are stored as the gear shifting characteristics.

FIG. 3A shows a vehicle speed table for automatic down shift in the case where a driving force margin of the vehicle calculated through procedures (will be described later) is "Large" (hereinafter, referred to as "automatic down shift line"). FIG. 3B shows an automatic down shift line in the case where the driving force margin is "Medium". FIG. 3C shows an automatic down shift line in the case where the driving force margin is "Small". In each graph, a double circle sign is a plot indicating the throttle valve opening degree with respect to current vehicle speed. Further, a portion in each graph to which hatching is applied indicates a range in which the slip ratio of the lock-up clutch 25 is set up to the loose region (region of slip ratio B shown in FIG. 2B).

Here, the procedures to calculate the driving force margin of the vehicle will be described. In order to calculate a driving force margin, determination of the degree of uphill or downhill of a road surface on which a vehicle drives is first carried out. In the determination of the degree of uphill or downhill, data on acceleration when a vehicle drives on each of a flat road and uphill or downhill road with given vehicle speed and a given accelerator pedal opening degree (or throttle valve opening degree) on the basis of prior tests and the like are accumulated. Then, actual acceleration at vehicle speed and an accelerator pedal opening degree during current driving is calculated from a change in vehicle speed per unit time. The actual acceleration thus calculated is compared with acceleration stored in the data to determine a state of an uphill or downhill road. Namely, in the case where the calculated value is larger than acceleration at a flat road (reference acceleration), it is determined that the state is a downhill road. In the case where the calculated value is smaller than the acceleration, it is determined that the state is an uphill road. Further, it is determined whether the state is a light, medium or heavy uphill or downhill road depending upon the degree of a difference.

Next, a concrete example of calculation of the driving force margin is shown. A throttle valve opening degree is obtained by integrating an amount of change of the throttle valve opening degree, and this throttle valve opening degree is converted into torque. Driving force (shaft torque) of the vehicle is obtained by dividing this torque by a radius of tire. Travel resistance, such as air resistance (a product of a square value of the vehicle speed, an air resistance coefficient and an area of a front surface of the vehicle) and rolling resistance is subtracted from the driving force, and a numerical value according to the degree of uphill or downhill previously calculated is added to or subtracted from it, whereby a driving force margin is calculated.

Here, the driving force margin of the vehicle calculated through the procedures described above is sectioned into any one of three steps of "Large", "Medium" and "Small" depending upon its magnitude in an expedient manner. One vehicle speed table to generate automatic down shift is then selected in accordance with which the driving force margin is sectioned into. Thus, as shown in FIGS. 3A to 3C, switching of the automatic down shift lines is carried out in accordance with whether the driving force margin is "Large", "Medium" or "Small". Here, as the driving force margin changes "Large"→"Medium"→"Small", the automatic down shift line is switched so as to shift from a low vehicle speed side to a high vehicle speed side in turn.

A driving state when the slip ratio of the lock-up clutch 25 is in the loose region in each of the driving force margins will be described. First, in a state in which the driving force margin is "Large" shown in FIG. 3A, an automatic down shift line D1 is positioned at the lower vehicle speed side from the current vehicle speed positioned on the double circle sign. Thus, automatic down shift is not generated even though the vehicle speed is increased. However, since the driving force margin is "Large", the vehicle speed can be increased smoothly even though automatic down shift is not generated. Therefore, since the slip ratio of the lock-up clutch 25 does not have to stagnate in the loose region, no problem such that temperature of the torque converter 21 increases occurs.

On the other hand, in a state in which the driving force margin shown in FIG. 3B is "Medium", switching of the automatic down shift line is carried out from the automatic down shift line D1 at the lower vehicle speed side to an automatic down shift line D2 at a medium vehicle speed side with respect to the state in which the driving force margin is "Large". However, the switched automatic down shift line D2 is still positioned at the lower vehicle speed side from the current vehicle speed (double circle sign). Thus, automatic down shift is not generated even though the vehicle speed is increased. However, since the driving force margin is "Medium", the vehicle speed can be increased smoothly, the slip ratio of the lock-up clutch 25 does not have to stagnate in the loose region. Therefore, no problem such that temperature of the torque converter 21 also increases occurs in this case.

Further, in the state where the driving force margin is "Small" as shown in FIG. 3C, switching of the automatic down shift line is carried out from the automatic down shift line D2 at the medium vehicle speed side to an automatic down shift line D3 at a higher vehicle speed side with respect to the state in which the driving force margin is "Medium". This causes the automatic down shift line D3 to be positioned at a higher vehicle speed side from the current vehicle speed (double circle sign). Thus, automatic down shift is generated with increase of the vehicle speed. Since the driving force margin is "Small" in this state, there is a fear that the slip ratio of the lock-up clutch 25 stagnates in the loose region if no automatic down shift is generated. However, the switching of the automatic down shift line to the higher vehicle speed side causes the automatic down shift to be generated at appropriate timing, whereby the driving force margin is increased. This makes it possible to avoid stagnation of the slip ratio of the lock-up clutch 25 in the loose region.

In this way, in the control device 1 of the automatic transmission for the vehicle according to the present embodiment, switching of the vehicle speed tables for automatic down shift is carried out in accordance with the driving force margin of the vehicle in the automatic down shift of the manual shift mode. Therefore, even in the case where the driving force margin is "Small", for example, at cruise driving on an uphill road (at hill-climbing by trailer traction), automatic down shift can be generated at appropriate timing. This makes it possible to increase the vehicle speed smoothly by enlarging the driving force margin. Therefore, it is possible to effectively prevent the slip ratio of the lock-up clutch 25 from stagnating in the loose region for a long time. This makes it possible to suppress the rise in temperature of the hydraulic oil (ATF) due to heat generation of the torque converter 21.

Figure 4A:
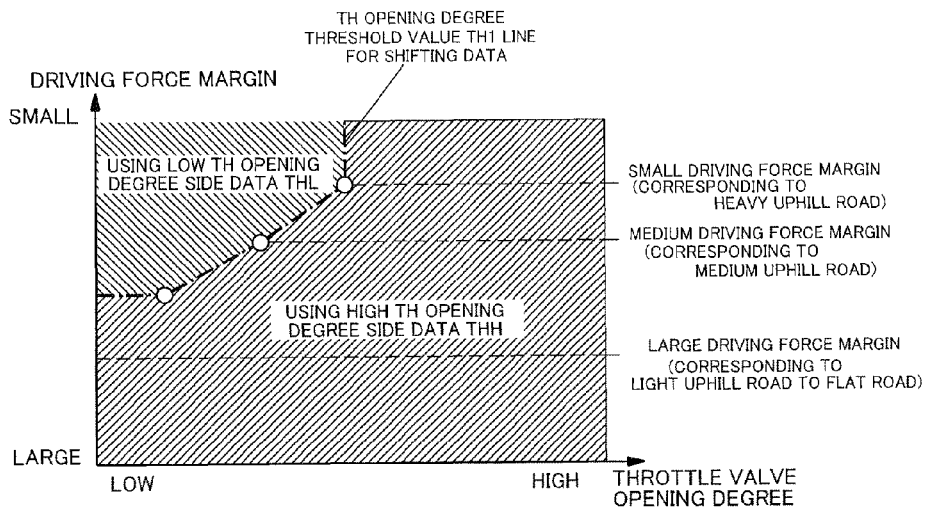
FIG. 4A is a graph showing a relationship between a throttle valve opening degree and the driving force margin, and is a graph showing distribution of a region in which low throttle valve opening degree side data are used and a region in which high throttle valve opening degree side data are used.
Figure 4B:
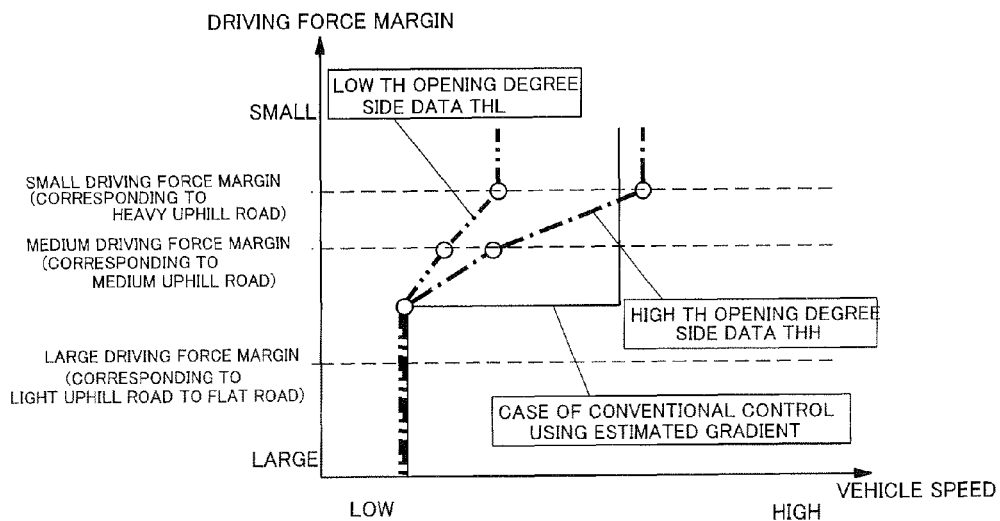
FIG. 4B is a graph showing a relationship between vehicle speed and the driving force margin, and is a graph showing a down shift vehicle speed table by the low throttle valve opening degree side data and a down shift vehicle speed table by the high throttle valve opening degree side data.

Further, in the control device 1 of the automatic transmission for the vehicle according to the present embodiment, control to switch the vehicle speed tables for the automatic down shift is further carried out in accordance with the throttle valve opening degree (engine load) in addition to switching of the vehicle speed tables for the automatic down shift according to the driving force margin as described above. Hereinafter, this control will be described. FIG. 4A is a graph showing a relationship between the throttle valve opening degree and the driving force margin. FIG. 4A shows a region in which low throttle valve opening degree side data THL are used as a vehicle speed table for down shift, a region in which high throttle valve opening degree side data THH are used, and a line of a threshold value TH1 of the throttle valve opening degree that is a boundary of both regions. FIG. 4B is a graph showing a relationship between the vehicle speed and the driving force margin. FIG. 4B shows distribution of the low throttle valve opening degree side data THL and distribution of the high throttle valve opening degree side data THH.

As shown in FIG. 4A, in the state in which the driving force margin is "Small" (corresponding to heavy uphill road) and the state in which the driving force margin is "Medium" (corresponding to medium uphill road), the low throttle valve opening degree side data THL are used at the side where the throttle valve opening degree TH is lower than the threshold value TH1 of the throttle valve opening degree, and the high throttle valve opening degree side data THH are used at the side where throttle valve opening degree TH is higher than the threshold value TH1 of the throttle valve opening degree. Further, in a region in which the driving force margin is larger than an upper limit of the threshold value TH1 of the throttle valve opening degree line, the high throttle valve opening degree side data THH are always used in spite of high or low of the throttle valve opening degree TH.

Further, as shown in FIG. 4B, in the state in which the driving force margin is "Large" (corresponding to light uphill road or flat road), the low throttle valve opening degree side data THL has the same vehicle speed distribution as that in the high throttle valve opening degree side data THH. However, in the state in which the driving force margin is "Small" (corresponding to heavy uphill road) and the state in which the driving force margin is "Medium" (corresponding to medium uphill road), the low throttle valve opening degree side data THL has distribution that is shifted to the low vehicle speed side compared with the high throttle valve opening degree side data THH. In this regard, in FIG. 4B, data on vehicle speed distribution for conventional down shift based on estimated uphill gradient is also shown as reference.

Figure 5:
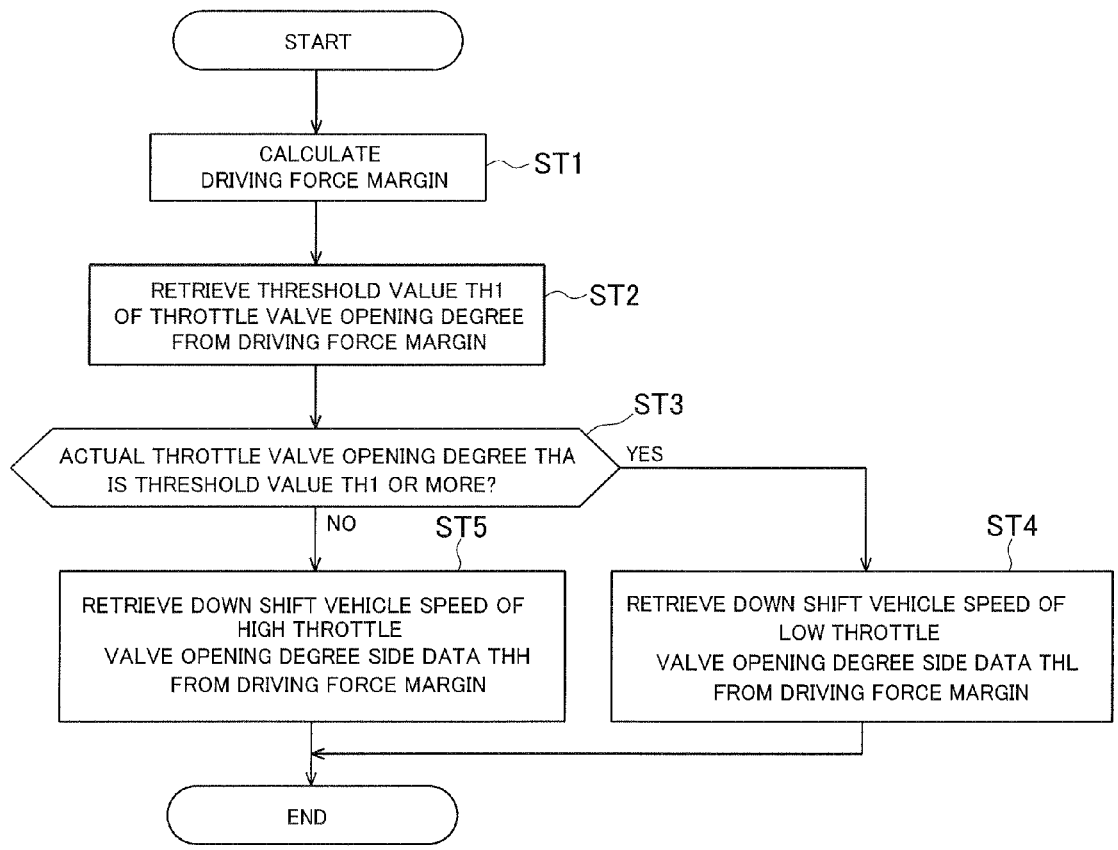
FIG. 5 is a flowchart showing procedures to switch automatic down shift vehicle speed tables in accordance with the throttle valve opening degree.

Procedures of switching of the vehicle speed tables for automatic down shift in accordance with the throttle valve opening degree will be described. FIG. 5 is a flowchart for explaining the procedures. Here, the ECU 30 first calculates a driving force margin through the calculation procedures as described above (Step ST1). The ECU 30 then retrieves the threshold value TH1 of the throttle valve opening degree from the calculated driving force margin (Step ST2). The retrieve of the threshold value TH1 of the throttle valve opening degree is carried out on the basis of a throttle valve opening degree threshold value table for shifting data in FIG. 4A. Subsequently, the ECU 30 determines whether or not a current actual throttle valve opening degree THA is the retrieved threshold value TH1 of the throttle valve opening degree or more (Step ST3).

As a result, in the case where it is determined that the current actual throttle valve opening degree THA is the threshold value TH1 of the throttle valve opening degree (YES), the ECU 30 retrieves vehicle speed corresponding to the previously calculated driving force margin from the high throttle valve opening degree side data THH (Step ST4). To illustrate this concrete example of the case where the driving force margin is "Small", this leads to a state in which vehicle speed V2 that is positioned at a side where a throttle valve opening degree is higher than the threshold value TH1 of the throttle valve opening degree on the automatic down shift line D3 shown in FIG. 3C is selected, and automatic down shift is thus generated at the vehicle speed V2.

On the other hand, in the case where it is determined that the current actual throttle valve opening degree THA is less than the threshold value TH1 of the throttle valve opening degree (NO), the ECU 30 retrieves vehicle speed corresponding to the previously calculated driving force margin from the low throttle valve opening degree side data THL (Step ST5). The case where the driving force margin is "Small" will be described as this concrete example. In the automatic down shift line D3 shown in FIG. 3C, this leads to a state in which vehicle speed V1 that is positioned at a side where a throttle valve opening degree is lower than the threshold value TH1 of the throttle valve opening degree is selected, and automatic down shift is thus generated at the vehicle speed V1.

Thus, in the control device 1 according to the present embodiment, the automatic down shift vehicle speed tables are switched on the basis of whether the actual throttle valve opening degree THA is larger or smaller than the threshold value TH1 of the throttle valve opening degree. Therefore, as in the case where the driving force margin is "Small" shown in FIG. 3C, it becomes possible to control automatic down shift so that the automatic down shift is generated only when the throttle valve opening degree THA is larger than the threshold value TH1 with respect to the same vehicle speed and no automatic down shift is generated when the throttle valve opening degree THA is smaller than the threshold value TH1. Namely, by avoiding generation of automatic down shift when the throttle valve opening degree (or accelerator pedal opening degree) is very small or zero at the same vehicle speed ("star" sign) while preventing stagnation of the vehicle speed by generating automatic down shift in a state ("double circle" sign) in which the throttle valve opening degree is larger and the slip ratio of the lock-up clutch 25 is positioned at the loose region, it is possible to prevent driving force during deceleration (engine brake) from overworking strongly. Therefore, both effective suppression of rise in temperature of the torque converter 21 at a cruise driving state on an uphill road and prevention of deterioration in driveability due to overwork of the engine brake at complete close of the accelerator pedal 14 can be achieved.

As explained above, in the control device 1 of the automatic transmission for the vehicle according to the present embodiment, the vehicle speed tables for automatic down shift in the manual shift mode are switched in accordance with the driving force margin of the vehicle. This makes it possible to effectively prevent vehicle speed from stagnating due to generation of appropriate automatic down shift against lowering of the driving force margin even at cruise driving on an uphill road or the like. In addition, it is possible to effectively prevent the slip ratio of the lock-up clutch 25 from stagnating in the loose region. Therefore, it is possible to effectively suppress rise in temperature of hydraulic oil due to heat generation of the torque converter 21. Further, by switching the vehicle speed tables for the automatic down shift in accordance with the driving force margin of the vehicle, it is possible to suppress generation of unnecessary automatic down shift in the case where a driving force margin is sufficient.

Further, the control device 1 of the automatic transmission for the vehicle according to the present embodiment is adapted to switch the automatic down shift vehicle speed tables on the basis of the throttle valve opening degree (or accelerator pedal opening degree) indicating the engine load is higher or lower than the threshold value in addition to the switching of the vehicle speed tables for the automatic down shift by means of the driving force margin as described above. This makes it possible to suppress rise in temperature of the torque converter 21 and to secure good driveability by means of suppression of excess engine braking during deceleration of the vehicle.

In this regard, in the control device 1 of the automatic transmission for the vehicle according to the present embodiment, the case where both switching of the vehicle speed tables for the automatic down shift based on the driving force margin and switching of the vehicle speed tables for the automatic down shift based on the engine load (throttle valve opening degree) are carried out has been described. However, in addition to this example, the control device of the automatic transmission for the vehicle according to the present invention may be configured so as to carry out either the switching of the vehicle speed tables for the automatic down shift based on the driving force margin or the switching of the vehicle speed tables for the automatic down shift based on the engine load (throttle valve opening degree).

Although the embodiments of the present invention have been explained above, the present invention is not limited to the above embodiment. Various modifications can be made in a scope of the technical idea described in the following claims, the specification described above and the accompanying drawings without departing from the spirit and scope of the present invention.

What is claimed is:

1. A control device of an automatic transmission for a vehicle, comprising:

a vehicle speed detecting section configured to detect vehicle speed;

an engine load detecting section configured to detect an engine load;

a travel resistance calculating section configured to calculate travel resistance of the vehicle;

an uphill gradient calculating section configured to calculate estimated uphill gradient of the vehicle;

a driving force margin calculating section configured to calculate a driving force margin of the vehicle on the basis of the engine load, the vehicle speed, the travel resistance and the estimated uphill gradient;

an automatic gear shifting section configured to determine a gear via a gear mechanism on the basis of predetermined gear shifting characteristics at least from the detected vehicle speed and the engine load to carry out automatic gear shifting;

a manual gear shifting signal outputting section configured to output a manual gear shifting signal indicating a shift up instruction or shift down instruction by a driver of the vehicle;

a manual gear shifting section configured to carry out, in response to the manual gear shifting signal outputted from the manual gear shifting signal outputting section, gear shifting from the gear determined on the basis of the predetermined gear shifting characteristics in accordance with the shift up instruction or shift down instruction;

a shift mode switching section configured to switch an operation between an automatic shift mode by the automatic gear shifting section and a manual shift mode by the manual gear shifting section and setting the operation to either the automatic or the manual shift mode; and an automatic down shifting section configured to generate automatic down shift when the vehicle speed detected by the vehicle speed detecting section becomes lower than a vehicle speed on an automatic down shift vehicle speed table set up in accordance with the determined gear when the operation is set to the manual shift mode with the shift mode switching section, wherein the automatic down shifting section corrects the automatic down shift vehicle speed table so as to shift to a high vehicle speed side or low vehicle speed side in accordance with the magnitude of the driving force margin of the vehicle calculated by the driving force margin calculating section;

wherein the gear mechanism is coupled to a torque converter; and wherein the control device is configured to suppress a rise in temperature of the torque converter as a result of the generated automatic down shift.

2. The control device as claimed in claim 1, wherein the automatic down shifting section is configured to further correct the automatic down shift vehicle speed table so as to increase the vehicle speed or decrease the vehicle speed when the engine load detected by the engine load detecting section is higher or lower than a predetermined threshold value.

3. A control device of an automatic transmission for a vehicle, comprising:

a vehicle speed detecting section configured to detect vehicle speed;

an engine load detecting section configured to detect an engine load;

a driving force margin calculating section configured to calculate a driving force margin of the vehicle on the basis of the engine load, the vehicle speed, a travel resistance and an estimated uphill gradient;

an automatic gear shifting section configured to determine a gear via a gear mechanism on the basis of predetermined gear shifting characteristics at least from the detected vehicle speed and the engine load to carry out automatic gear shifting;

a manual gear shifting signal outputting section configured to output a manual gear shifting signal indicating a shift up instruction or shift down instruction by a driver of the vehicle;

a manual gear shifting section configured to carry out, in response to the manual gear shifting signal outputted from the manual gear shifting signal outputting section, gear shifting from the gear determined on the basis of the predetermined gear shifting characteristics in accordance with the shift up instruction or shift down instruction;

a shift mode switching section configured to switch an operation between an automatic shift mode by the automatic gear shifting section and a manual shift mode by the manual gear shifting section and setting the operation to either the automatic or the manual shift mode; and an automatic down shifting section configured to generate automatic down shift when the vehicle speed detected by the vehicle speed detecting section becomes lower than a vehicle speed on an automatic down shift vehicle speed table set up in accordance with the determined gear when the operation is set to the manual shift mode with the shift mode switching section, wherein the automatic down shifting section corrects the automatic down shift vehicle speed table so as to respectively shift to a high vehicle speed side or low vehicle speed side in accordance with the magnitude of the driving force margin of the vehicle and when the engine load detected by the engine load detecting section is higher or lower than a predetermined threshold value;

wherein the gear mechanism is coupled to a torque converter; and wherein the control device is configured to suppress a rise in temperature of the torque converter rising as a result of the generated automatic down shift.

* * * * *